(12) United States Patent
Arakane et al.

(10) Patent No.: US 6,588,597 B2
(45) Date of Patent: Jul. 8, 2003

(54) DISPOSAL SYSTEM FOR PLASTIC

(75) Inventors: Nobuaki Arakane, Ibaraki-ken (JP); Masakatsu Hayashi, Ushiku (JP); Yoshiyuki Takamura, Kudamatsu (JP); Tsutomu Hasegawa, Niiza (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,378

(22) PCT Filed: Mar. 19, 1997

(86) PCT No.: PCT/JP97/00915
§ 371 (c)(1),
(2), (4) Date: Dec. 1, 1999

(87) PCT Pub. No.: WO98/41374
PCT Pub. Date: Sep. 24, 1998

(65) Prior Publication Data
US 2002/0153285 A1 Oct. 24, 2002

(51) Int. Cl.[7] .............. B03B 1/00; B02C 23/08
(52) U.S. Cl. .............. 209/4; 209/17; 209/31; 209/39; 209/256; 209/913; 241/68; 241/79.2
(58) Field of Search .............. 209/3, 3.1, 10, 209/12.1, 17, 38, 39, 930, 21, 30, 31, 255, 256, 258, 913, 4; 241/38, 68, 76, 79.2, DIG. 38

(56) References Cited

U.S. PATENT DOCUMENTS

| | | | | |
|---|---|---|---|---|
| 3,945,575 A | * | 3/1976 | Marsh ............. | 241/DIG. 38 X |
| 4,126,541 A | * | 11/1978 | Orzechowski .......... | 209/256 X |
| 4,264,352 A | * | 4/1981 | Houser ............. | 209/11 X |
| 5,143,308 A | * | 9/1992 | Hally et al. ............. | 209/930 X |
| 5,335,786 A | * | 8/1994 | Roberto ............. | 209/10 X |

FOREIGN PATENT DOCUMENTS

| | | | | |
|---|---|---|---|---|
| DE | 4306781 | * | 9/1994 | .......... 209/930 |
| EP | 530934 | * | 3/1993 | .......... 209/930 |
| JP | 50-142681 | | 11/1975 | |
| JP | 56-102649 | | 8/1981 | |
| JP | 63-276509 | | 11/1988 | |
| JP | 3-187712 | | 8/1991 | |
| JP | 4229210 | | 8/1992 | |
| JP | 5147040 | | 6/1993 | |
| JP | 6-63946 | | 3/1994 | |
| JP | 6-502122 | | 3/1994 | |
| JP | 6-226743 | | 8/1994 | |
| JP | 6-293025 | | 10/1994 | |
| JP | 9841374 | | 9/1998 | |

* cited by examiner

Primary Examiner—Tuan N. Nguyen
(74) Attorney, Agent, or Firm—Antonelli, Terry, Stout & Kraus, LLP

(57) ABSTRACT

A treating system for selecting and recovering reusable materials from used composite plastics is constituted by a crushing process, a cleaning and grading process and a plastics separation process. The treating system for the composite plastics is constituted by combining the cleaning and grading process in which a mechanical impact force and a friction force are applied to the plastic crushed pieces so as to clean the plastics and form the gain size of the plastics, and the plastics separation process with using a hydrocyclone. Accordingly, a selecting accuracy of the selected and recovered plastics is significantly improved and the plastics are separated to high-purity plastics, whereby it is possible to utilize the recovered plastics as recycled materials.

11 Claims, 7 Drawing Sheets

DISPOSAL SYSTEM FOR PLASTIC

BACKGROUND OF THE INVENTION

1. Field of the Invention

The present invention relates to a system for treating a composite plastic which fractionates and recovers a useful material from a plastic composite product occupying much of general waste products and a plastic bottle in container and package waste products.

2. Related Art

Plastic products include a product using a composite plastic obtained by combining a multiple layers of plastics having different materials, a product obtained by forming a combination of some kinds of plastics, and the like. Among them, a production amount of the plastic bottle which is light, tough and sanitary is quickly increased. Accordingly, an amount of discarded plastic bottle corresponding to the container and package waste products among the general waste product generated at a large amount is increased year by year. It is necessary to quickly promote to utilize a polyethylene terephthalate (PET) bottle belonging to the plastic bottles conventionally treated as the general waste products for a recycled material, and it is requested to prepare a system for quickly recovering and reproducing the bottles.

As a prior art of the treating system for recovering the recycled material from the plastic bottles, there is a reproducing plant for PET bottles described in "Current Status and Problems of PET Bottle Recycle" in Environmental Conservation Engineering (pages 19 to 22, vol. 25 in 1996).

The treating system in the reproducing plant at first performs a cleaning of the recovered plastic bottles and a removal of foreign matters such as aluminum caps and the like. Thereafter, in order to facilitate a selection of material from the composite material used for the plastic bottle, the recovered plastic bottles are crushed into a flake shape, the crushed pieces of the plastic bottles are cleaned by a flake cleaner using an alkali cleaning liquid, and the cleaned crushed pieces are selected into two portions comprising matters floating in a specific gravity fluid and sediments therein. Thereafter, in order to select a plastic with a higher purity after a drying process, the crushed pieces from which labels having various colored designs and small specific gravity are removed by using an air force are recovered as the recycled material for preventing the labels from mixing. Only the selected crushed pieces are again cleaned and dried, thereby being recovered as a useful plastic.

In the prior art mentioned above, since a cleaning system of injecting a lot of cleaning water to the plastic is employed for cleaning a dirt and a smell attached to the plastic, a lot of drain is generated from the treating system, so that it is necessary to prepare equipment for treating the drain with taking into consideration a secondary public environmental pollution due to the drain.

Further, there is a problem that the specific gravity selecting process by the specific gravity fluid in accordance with the prior art mentioned above has a bad selecting rate (a bad recovering rate).

Further, there has been known "Method of Treating Used Plastic Bottle" described in Japanese Patent Unexamined Publication No. 1-148517 and "Method of Recovering Polyester Resin Reproduced Raw Material From PET Bottle" described in Japanese Patent Unexamined Publication No. 61-68207.

The former intends to improve a selecting operation and a crushing efficiency by separating the heated and shrunk used plastic bottles into materials and thereafter crushing at each of the materials. The latter is a process of selecting and recovering the crushed pieces at each of the materials by adding a mineral powder material to the crushed pieces of the crushed PET bottle and utilizing a mechanical friction operation.

Both of the treating methods heat the PET bottles so as to facilitate a separation of the material from the bottles, and since the former separating method manually separates the materials, there is a problem that too many hands are required for treating a lot of plastic bottles. Further, since the latter removes the mineral powder materials attached to the selected crushed pieces, a process of cleaning the selected plastics, a process of recovering the mineral powder materials and the like are required, so that a cost for equipment is increased.

SUMMARY OF THE INVENTION

An object of the present invention is to provide a plastic treating system for selecting and recovering high quality plastics at each of materials in order to utilize used plastic bottles as a recycled material.

Another object of the present invention is to recover a high quality plastic.

In order to achieve the object mentioned above, in accordance with the present invention, there is provided a plastic treating system comprising a crushing apparatus for crushing a composite plastic mainly formed by a plastic as a main material, a dry cleaning apparatus for applying a mechanical impact force and frictional force to crushed pieces crushed by the crushing apparatus, and a selecting apparatus for selecting the crushed pieces into various kinds of plastics by utilizing a difference in a specific gravity of the cleaned crushed pieces.

Further, in order to achieve the another object mentioned above, in accordance with the present invention, there is provided a plastic treating method comprising a crushing process of crushing a composite plastic mainly formed by a plastic as a main material, a cleaning process of cleaning crushed pieces crushed in the crushing process, and a selecting process of selecting the crushed pieces into various kinds of plastics by utilizing a difference in a specific gravity of the cleaned crushed pieces, wherein there is further provided a process of cleaning each of the processes at a time of switching the composite plastic material to be treated to another composite plastic being different in both or one of a color and a material.

BEST MODE FOR CARRYING OUT THE INVENTION

A first embodiment of the present invention will be described below with reference to FIGS. 1 and 2 which respectively show a flow chart of a plastic bottle treating system and a summary of the treating system.

Composite plastics include a product composed of a polypropylene (PP), a polyvinyl chloride (PVC) and a polyurethane (PUR) such as trim parts for an automotive vehicle and a plastic bottle composed of a polyethylene terephthalate (PET) and the PP, however, the present embodiment will be described below with reference to a plastic bottle made of a composite plastic.

A kind of the plastic bottle used for drinks, foods, cleaning fluids or the like mainly includes a polyethylene terephthalate (PET), a polypropylene (PP), a polyethylene (PE), a polystyrene (PS), a polyvinyl chloride (PVC) and the like, however, the present embodiment will be described below with reference to a PET bottle as an embodiment of a material recovering treatment from the used plastic bottles.

Generally, the PET bottle includes a product which is made of only PET and a product in which a container portion is made of PET and a neck portion is made of PP, and a plastic film label for distinguishing own product from the other products is wound around the container or a paper label is bonded to the container.

Figure 1:
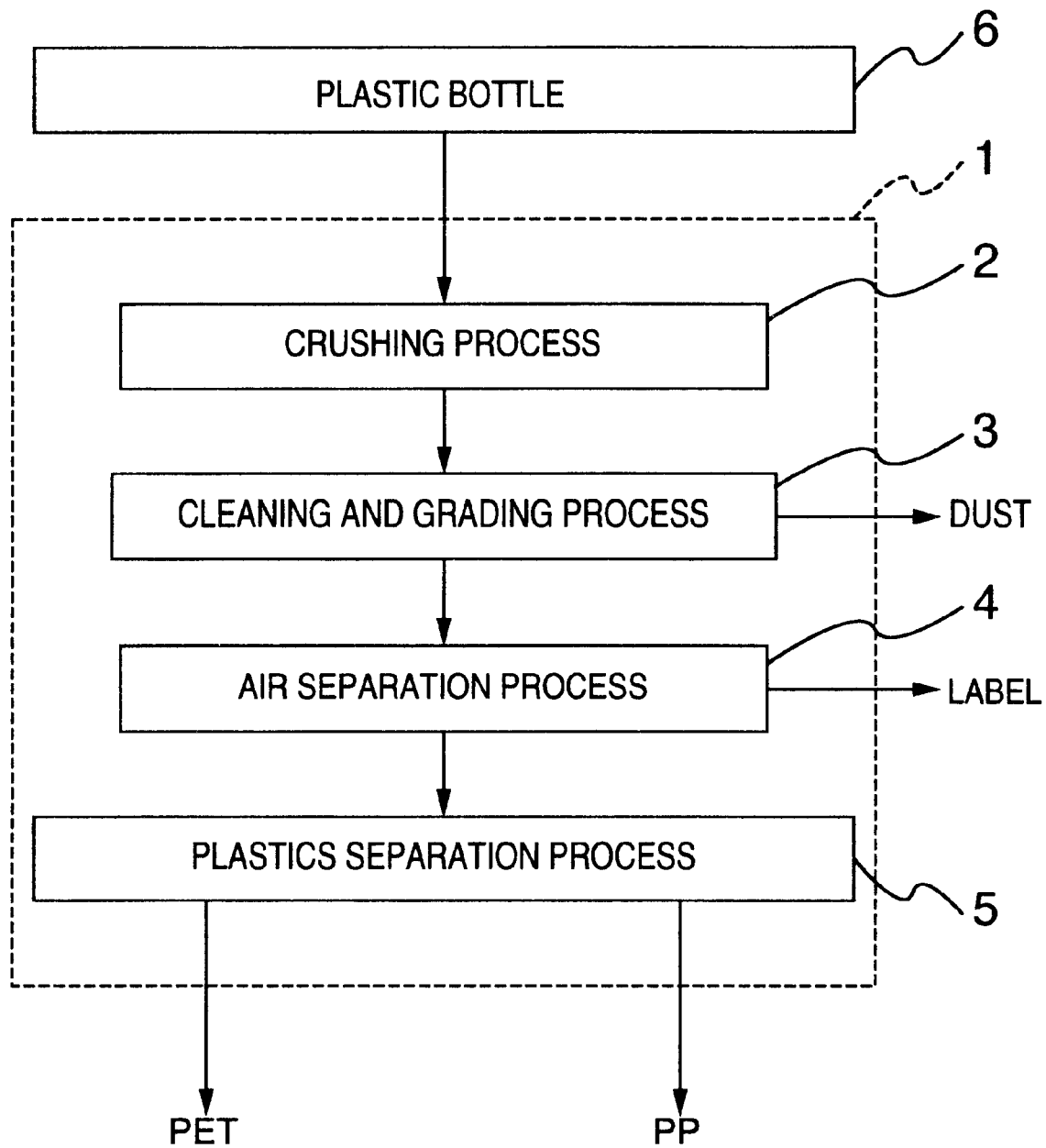
FIG. 1 is a flow chart of a plastic bottle treating system.

A treating system 1 for separating a plastic used in a plastic bottle into materials so as to recover shown in FIG. 1 is constituted by a crushing process 2, a cleaning and grading process 3, an air separation process 4 and a plastics separation process 5.

Figure 2:
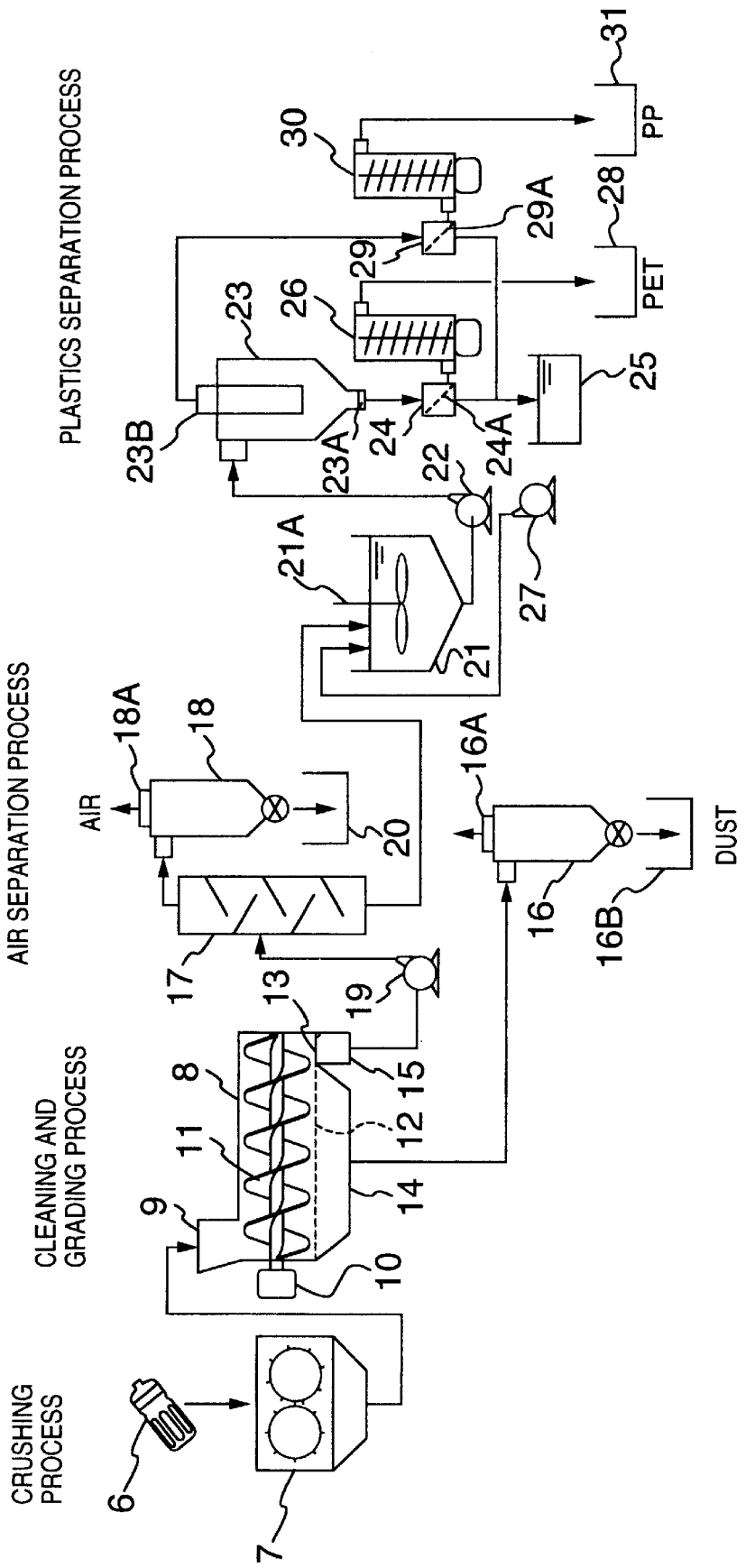
FIG. 2 is a schematic view of the treating system.

In FIG. 2, a PET bottle 6 is at first put into a crusher 7, and crushed into a grain size suitable for a later selecting process, and crushed pieces of the PET bottle 6 are supplied to a screw type plastic abrading device 8 in the cleaning and grading process 3. The plastic abrading device 8 is constituted by an inlet portion 9, a screw blade 11 driven and rotated by a motor 10, a screen 12 for removing dust, a discharge valve 13 for periodically discharging crushed pieces greater than a hole of the screen, and discharge ports 14 and 15 for discharging the crushed pieces.

An impact force is applied to the crushed pieces of the PET bottles put into from the inlet portion 9 in accordance with a rotation of the screw blade 11, and a frictional force is applied to the crushed pieces staying in an outermost peripheral portion of the screw blade 11 in accordance with a compression between the crushed pieces staying between the screw blade 11 and the screen 12 or within the abrading device 8. By applying an impact force and a friction force to the crushed pieces of the PET bottles in the manner mentioned above, a cleaning effect of peeling the labels and the dirt attached to the surface of the crushed pieces can be obtained without using a cleaning water, and a grain size forming effect of forming the crushed pieces having a rough crushed cross sectional shape only after the treatment in the crushing process to a smooth shape can be obtained.

Figure 8:
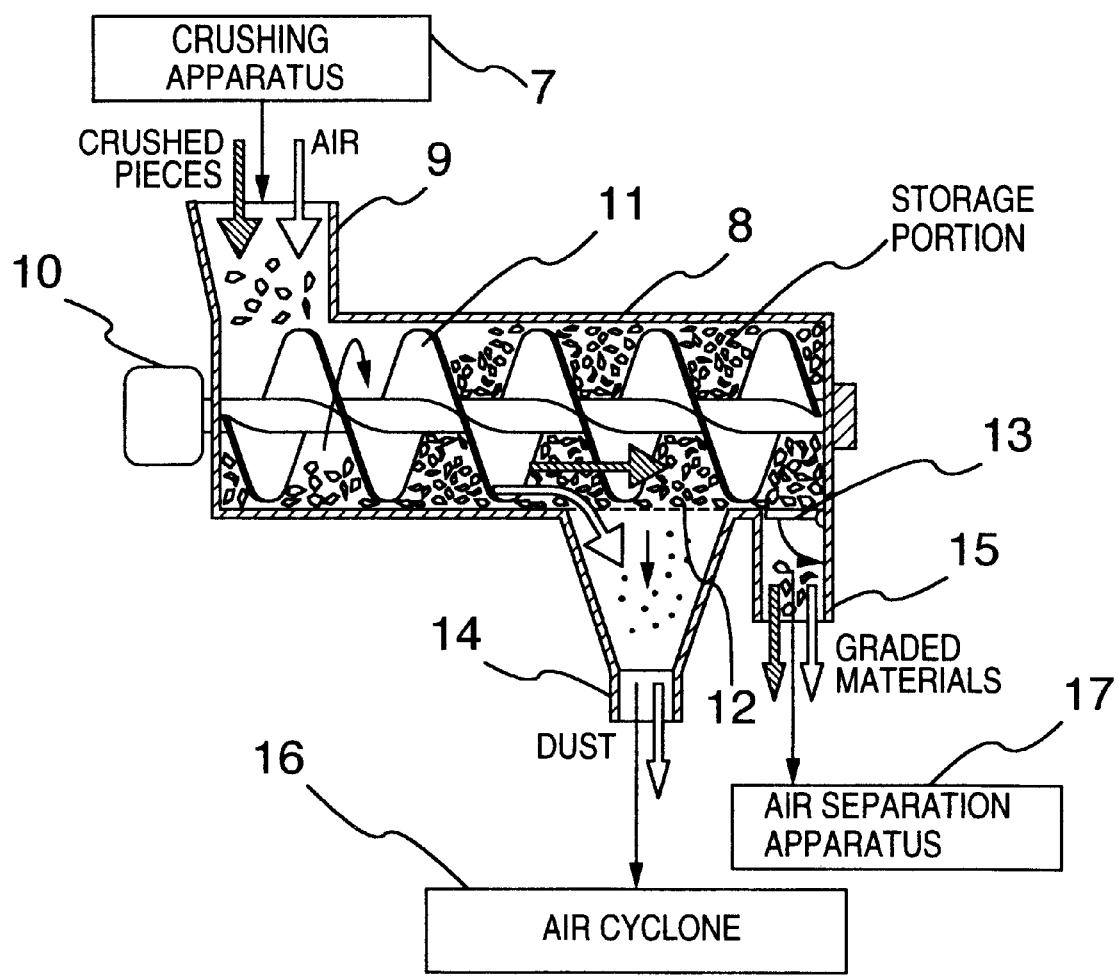
FIG. 8 is a schematic view which explains details of a cleaning and grading apparatus.

Here, a description will be given of a principle of a dry type cleaning method and a grain size forming method performed by the cleaning and grading apparatus 8 below with reference to FIG. 8. This description is performed with reference to an embodiment of the crushed pieces of the PET bottle made of the PET and PP crushed by the crusher 7.

The cleaning and grading apparatus 8 has the screw blade 11 driven and rotated by the motor 10 at a center portion of the cylindrical container, and the inlet port 9 for putting the plastics thereinto is provided in an upper portion of the container. The screen 12 for passing the pieces having a grain diameter of about 1 mm or less therethrough is provided on a wall surface of a lower portion of the container, and the pieces after passing through the screen 12 are discharged to the discharge port 14. Further, the discharge valve 13 for periodically performing an automatic opening and closing operation is provided in a downstream side of the crushed piece flow in the lower portion of the container, and the plastics disposed within the container and having a grain diameter of 1 mm or more are discharged from the discharge portion 15 by opening the discharge valve 13. An air by an air cyclone flows within the container from the inlet port 9 to the discharge port 14.

When putting the plastic crushed pieces from the inlet port 9, the crushed pieces dropping into the container is conveyed to a downstream side in accordance with a rotation of the screw blade 11. When subsequently supplying the crushed piece, a density of the crushed pieces stored in the downstream side is increased and a pressure is applied to the crushed pieces, so that the impact force caused by a collision between the crushed pieces and a collision between the crushed pieces and the wall surface of the container and a friction force caused by a friction are applied to the crushed pieces. When the impact force and the friction force are applied to the crushed pieces, the surfaces of the crushed pieces are abraded, so that a cleaning effect of peeling the dirt of the abrasive material and the like attached to the crushed pieces can be obtained. Further, projections of the crushed pieces are simultaneously abraded and shapes thereof are smoothened. That is, a grain size forming effect can be obtained.

The dirt scraped out from the crushed piece and the fine crushed plastic material due to the cleaning and grading operation are discharged from the discharge port 14 through the screen 12 in accordance with the suction force by the air cyclone 16. When a sufficient cleaning and grading effect is applied to the crushed pieces, the discharge valve 13 is opened and the crushed pieces are discharged from the discharge port 15 due to the suction force by a blower 19. (See FIG. 2).

As mentioned above, the cleaning and grading apparatus 8 does not use the cleaning fluid which is used in the prior art, but has an increased continuity in comparison with a batch treatment in which the crushed pieces are put into a cleaning tank so as to be cleaned.

The fine grains having a grain size of 1 mm or less after passing through the screen 12 is put into the air cyclone 16 from the discharge port 14 due to a suction force of the air cyclone 16 in the air separation process 4. The air cyclone 16 discharges a gas having a small specific gravity from an upper portion and discharges a solid having a large specific gravity from a lower portion by utilizing a swirling flow of the air generated by driving a blower 16a. As a result, the fine grains of the PET bottle crushed pieces are recovered in a recovery port 16b.

In addition to the plastics in the container and the neck portion, plastic or paper labels designed in variety of colors are mixed in the crushed pieces after the dust are removed (dry cleaned). Accordingly, in order to recover high quality plastics from the PET bottles, it is necessary to recover the plastics of the same color and the same material, so that it is necessary to remove the labels from the crushed pieces. In order to remove the labels, an air separation apparatus 17 and an air cyclone 18 provided in the air separation process 4 are employed.

The crushed pieces having a grain diameter of 1 mm or more are discharged from the discharge portion 15 due to a suction force of the blower 19 by periodically opening and closing the discharge valve 13 arranged in the discharge portion 15, and are supplied to the air separation apparatus 17. Within the air separation apparatus 17, a rising current of air is generated by driving a fan 18a provided in the air cyclone 18, the plastic films, the papers and the like having a small specific gravity are conveyed to the air cyclone 18 by the rising current of air and are recovered in the recovery port 20. On the contrary, the PET and PP plastics corresponding to the crushed pieces having a great specific gravity which can not be conveyed by the rising current of air are discharged from the lower portion and are fed out to the plastics separation process 5.

In the plastics separation process 5, a selection at each of materials is performed by utilizing a difference between a specific gravity fluid and a plastic, however, in this case, since the PET (having a specific gravity of 1.27) and the PP (having a specific gravity of 0.97) corresponding to the plastics to be treated have a specific gravity of about 1.0, a water is used for the specific gravity fluid. The other specific gravity fluid different from the water may be employed in accordance with the object to be selected.

The plastics separation process is constituted by a mixing tank 21, a hydrocyclone 23 for selecting the plastics and drying apparatuses 26 and 30 for drying the selected plastics.

The mixing tank 21 is constituted by a water tank for storing a water corresponding to the specific gravity fluid and a mixer 21a, mixes the plastics put under the water so as to remove bubbles attached to the surface of the plastics and sink the plastics to a bottom portion of the water tank and facilitates a conveying of the plastics by a circulating pump 22, thereby supplying the water and the plastics to hydrocyclone 23.

As in detail mentioned below, hydrocyclone 23 generates a swirling water current in accordance with the water stream along the cylindrical wall surface, forms an air column by the air sucked from the lower discharge portion at this time in the center portion thereof, and discharges the water from the lower discharge portion 23a and the upper discharge portion 23b. When supplying the mixed plastics of the PET and the PP to hydrocyclone, the PET crushed pieces having a large specific gravity swirl around the wall surface of hydrocyclone by the swirling water stream and are discharged from the lower discharge portion 23a, and on the contrary, the PP crushed pieces having a small specific gravity swirl around the air column and are discharged from the upper discharge port 23b, so that the PET and the PP are selected.

The selected PET crushed pieces are conveyed to the dryer 26 at a water amount suitable for conveying to the dryer 26 by a water amount adjusting device 24, and the extra water passes through a water amount adjusting plate 24a and is flowed out to the water storage tank 25. The water in the water storage tank 25 is returned to the mixing tank 21 by the circulating pump 27 so as to circulate the water within the plastics separation process. The dryer 26 drains the water attached to the PET crushed pieces in accordance with a high speed rotation of a rotating blade 26a and the PET crushed pieces are recovered in a recovery port 28. In the same manner, in the selected PP, an extra water is drained to the water storage tank 25 by a water amount adjusting device 29, the selected PP crushed pieces are recovered in a recovery port 31 in accordance with a treatment of the dryer 30.

Figure 9:
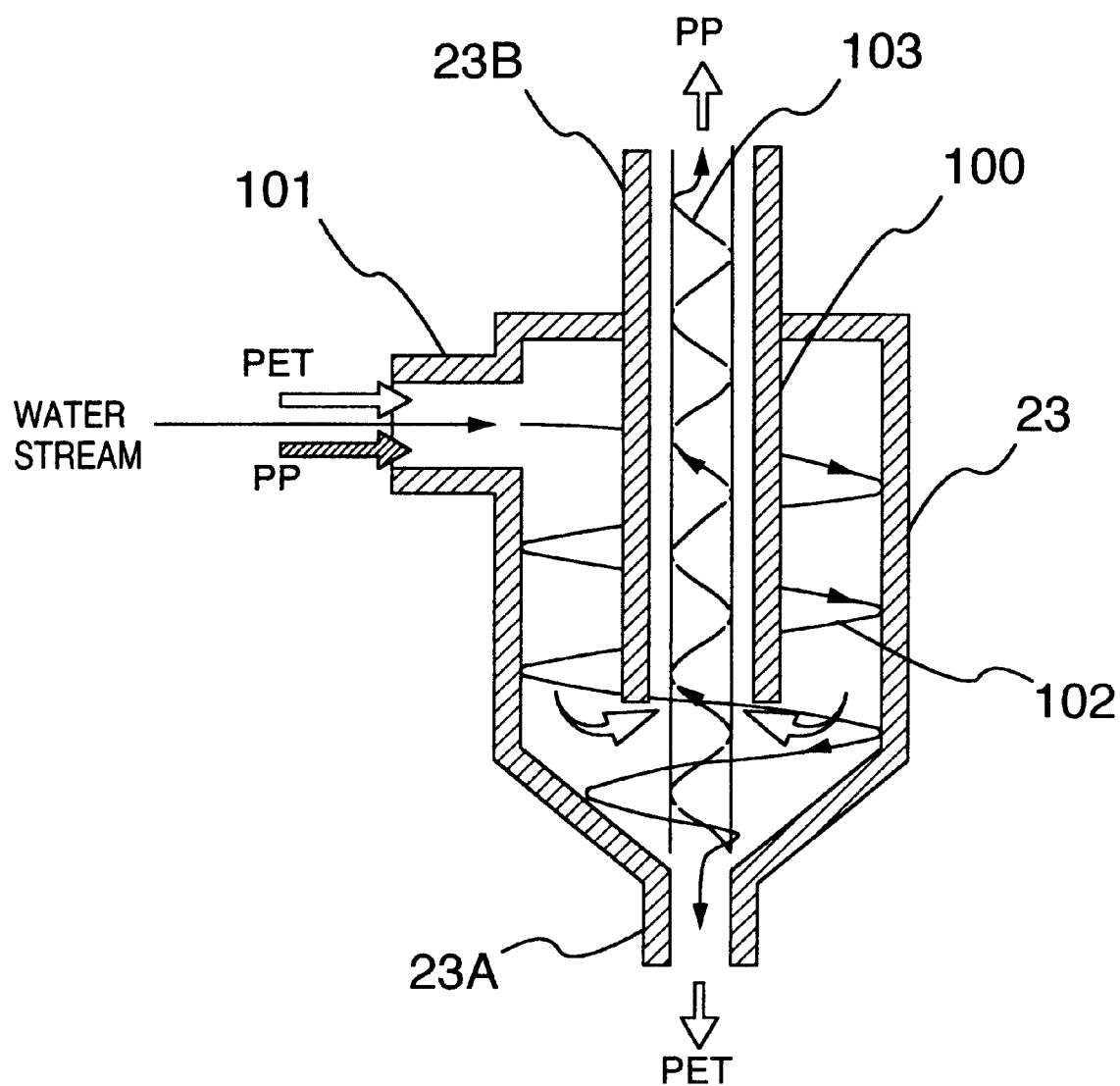
FIG. 9 is a schematic view which explains details of a liquid cyclone.

Here, a principle of separation in hydrocyclone 23 will be described below with reference to FIG. 9 by using the mixed plastic crushed pieces of the PET and the PP. Hydrocyclone 23 has a cylindrical container having a conical discharge portion 23a in a lower portion thereof, a cylindrical inserting pipe 100 provided at a center portion of the container, and an inlet port 101 provided in a tangential direction of the wall surface of the container.

The water (the specific gravity fluid) supplied from the inlet port 101 generates a downward swirling stream 102 along the wall surface of the container and an upward swirling stream 103 at the center portion. When supplying the mixed plastic crushed pieces into the container from the inlet port 101 together with the water, the PP plastic crushed pieces having a specific gravity less than 1.0 are sucked to the upward swirling stream 103 (are pressed out together with the water stream), and ascend within the inserting pipe 100 so as to be discharged from the upper discharge portion 23b in hydrocyclone. The PET plastic crushed pieces having a specific gravity more than 1.0 are strongly affected by an operation of a centrifugal force due to the swirling stream so as to descend within the container on the downstream swirling stream 102, and are discharged from the lower discharge portion 23a without being sucked to the upward swirling stream 103. On the basis of this principle, the mixed plastic crushed pieces are separated into two portions respectively having a specific gravity larger than the specific gravity of the water corresponding to the specific gravity fluid and having a specific gravity smaller than that of the water. Further, in the case of selectively separating a mixed material comprising a metal such as an aluminum and a plastic into the metal, the plastics having a specific gravity larger than that of the water are discharged from the upper discharge portion and only the metals are discharged from the lower discharge portion on the downward swirling stream by changing parameters such as port diameters of the upper and lower discharge portions, a water amount, a length of an inserting pipe and the like so as to control the suction force of the upward swirling stream, whereby it is possible to separate the metals and the plastics.

In order to verify an effect of combination between the cleaning and grading process and the plastics separation process by hydrocyclone in accordance with the present embodiment, a selecting performance is compared with the prior art. The plastics to be treated are set to the PET and the PP, and rough crushed pieces only being roughly crushed in the crushing device and crushed pieces having a formed grain size are used for the plastic shapes. Further, the comparison of the performance of the selecting apparatus is examined by using the specific gravity selecting apparatus for selecting the plastics only by a floating and sinking with respect to the specific gravity fluid. The selecting performance with respect to the crushed pieces and the selecting apparatus is shown in Table 1. The selecting performance is compared on the basis of a recovering rate showing a quality of the plastics.

TABLE 1

In the case of putting the crushed pieces without executing the dry type cleaning and grading process shown in the present embodiment into the specific gravity selection (the selecting apparatus utilizing the characteristic that the crushed pieces having a specific gravity larger than that of the water sink and the light crushed pieces float when putting the composite crushed pieces into the water flowing in a slow speed) known in the prior art, a recovery rate is only 87.2%, however, when the rough crushed pieces are passed through the dry type cleaning and grading process, the recovery rate is 4.2% increased even in the same selecting apparatus. Further, when setting the selecting method to hydrocyclone, the recovery rate is 96.1% in the case of the rough crushed pieces, however, the recovery rate is 99.3% in the case of the grain size formed crushed pieces, so that a result actually having no problem can be obtained.

The reason thereof will be described below. When crushing the thin plastics obtained by an injection molding such as the plastic bottles, the crushed cross section of the plastics cut and broken by the crushing device becomes a rough shape, and the crushed pieces of the PET container become in a shape such that layered plates are going to be peeled. When treating the plastic crushed pieces formed in this shape in accordance with the floating and sinking type specific gravity selecting method utilizing the difference of the specific gravity of the material with using the specific gravity fluid, it is hard to remove the bubbles attached to the crushed cross section and the gap between the plates, and an apparent specific gravity of the plastics is changed due to an attachment of the bubbles, whereby the selecting performance is reduced. Accordingly, the purity of the recovered plastics becomes low and it is hard to keep a quality suitable for the recycled material.

On the contrary, in the case of employing the dry type cleaning and grading process, since the grain diameter is aligned, the rate of attaching the bubbles is reduced, so that the selecting rate (the recovering rate) is widely improved even in the conventional floating and sinking type specific gravity selecting apparatus.

On the contrary, in hydrocyclone, a high recovering rate of 96.1% can be obtained even in the rough crushed pieces, however, as is different from the floating and sinking type specific gravity selecting apparatus simply in accordance with the difference of the specific gravity, the selection is performed by utilizing the centrifugal fore caused by the water stream as mentioned above. Due to the water stream, in the crushed pieces after passing through the dry type cleaning and grading process, most of the bubbles are removed and the recovering rate of about 100% can be obtained.

Figure 3:
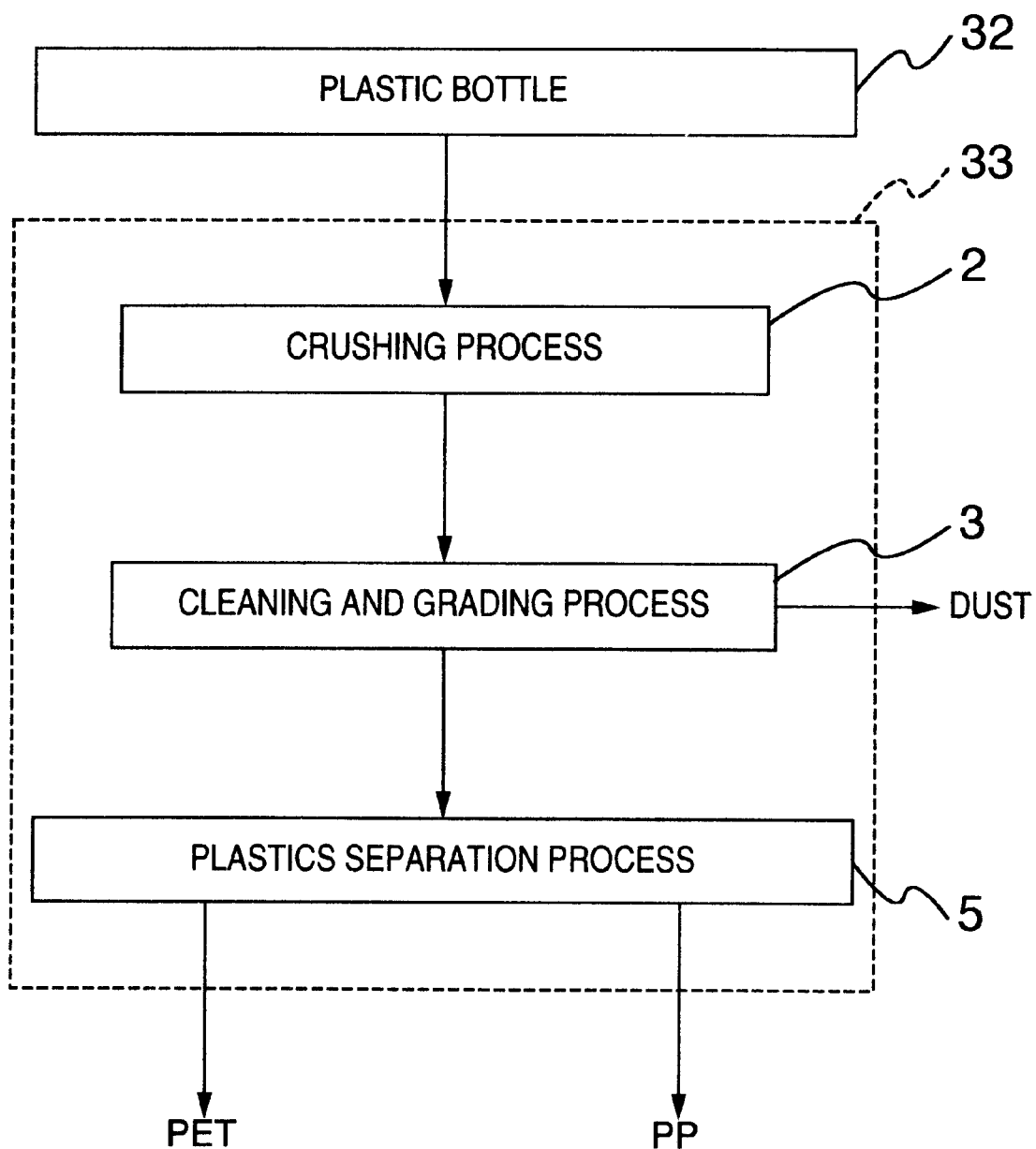
FIG. 3 is a flow chart of a plastic bottle treating system.

Next, a second embodiment will be described below with reference to FIG. 3. FIG. 3 shows a flow chart of a treating system which separates the plastics used for the plastic bottles into materials so as to recover. Further, a plastic bottle 32 to be treated is a bottle container to which aluminum cap and ring, and a plastic or paper label are not attached, and has a container portion made of PET and a neck portion made of PP. This treatment is previously performed not only in a pre-treating process in a retreating plant but also by a consumer.

The plastic bottles 32 supplied to a treating system constituted by the crushing process 2, the cleaning and grading process 3 and the plastics separation process 5 are crushed into crushed pieces having a grain diameter suitable for a selecting treatment in the crushing process 2, and the crushed pieces are put into the dry type cleaning and grading process 3. In the dry type cleaning and grading process 3, the dirt attached to the plastics are peeled out and crushed cross sections of the crushed pieces are formed in a smooth shape. Then, the cleaned and peeled crushed pieces are supplied to the plastics separation process 5 so as to be separated into the PET and the PP. Accordingly, in addition to the effect of the first embodiment mentioned above, there is an effect that a process of selecting the crushed aluminum and plastic is not required.

Figure 4:
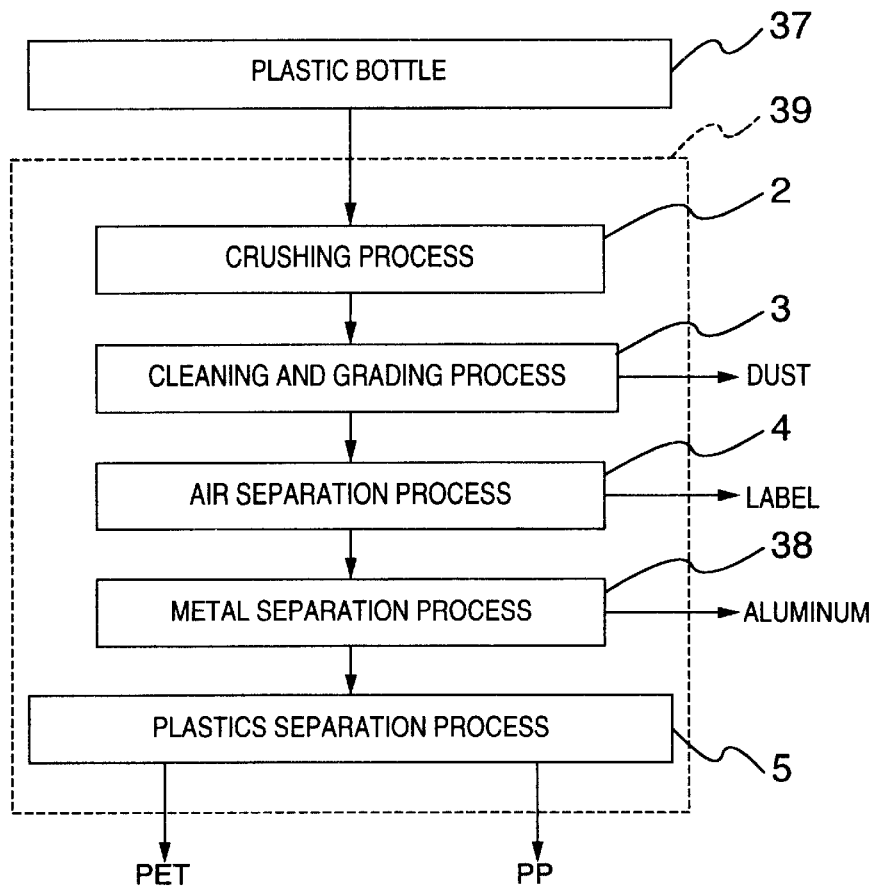
FIG. 4 is a flow chart of a plastic bottle treating system.
Figure 5:
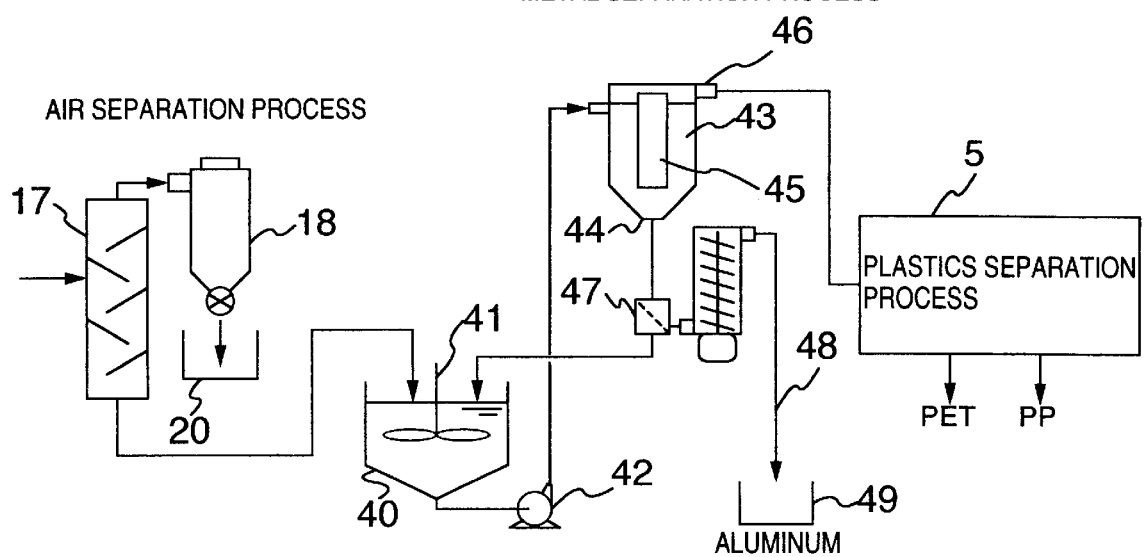
FIG. 5 is a schematic view of a metal separation process in the plastic bottle treating system.

Next, a third embodiment will be described below with reference to FIGS. 4 and 5. FIG. 4 shows a flow chart of a system, and FIG. 5 shows a summary of a metal separating process. Further, a plastic bottle 37 to be treated in this selecting process is structured such that an aluminum cap or ring is attached thereto, a plastic label or a paper label is attached thereto and a container portion is made of PET and a neck portion is made of PP.

The plastic bottles 37 are treated by a treating system 39 constituted by the crushing process 2, the cleaning and grading process 3, the air separation process 4, a metal separation process 38 and the plastics separation process 5.

The composite crushed pieces crushed in the crushing process 2 are dried and cleaned in the cleaning and grading process. The composite crushed pieces treated in the cleaning and grading process 3 are put into the air separation device 17 in the air separation process 4 and separated into the plastic or sheet labels having a small specific gravity and the plastics or the metals having a large specific gravity, and the labels are recovered in the recovery port 20 by the air cyclone 18. On the contrary, the plastic and metal crushed pieces from which the labels are removed are put into a mixing tank 40 constituted by a water tank and a mixer 41 in the metal separation process 38, the bubbles attached to the crushed pieces are removed and the crushed pieces are simultaneously promoted to sink to the bottom portion within the mixing tank 40 in accordance with a mixing operation of the mixer 41 within the water tank, and the crushed pieces in the mixing tank 40 are discharged and conveyed to a hydrocyclone 43 by a circulating pump 42. A swirling stream of a water corresponding to a specific gravity fluid is generated within hydrocyclone 43, and the water stream is separated into a stream which discharges the water from a lower discharge portion 44 while swirling on a wall surface of hydrocyclone 43 and a stream which is sucked up within an inserting pipe 45 arranged at a center portion thereof so as to discharge the water from an upper discharge port 46. Further, hydrocyclone 43 in the metal separation process 38 and hydrocyclone 23 in the plastics separation process 5 are different in view that a characteristic is separated in accordance with a balance of an amount of the water discharged from the upper and lower portions, and hydrocyclone 43 which separates the crushed pieces into the aluminum (having a specific gravity of 2.7) having a specific gravity larger than the specific gravity 1.0 of the water and the plastic (having a specific gravity of 0.97 to 1.36) is structured such that the upper discharge amount is set to be greater so as to discharge only all the plastics from the upper portion.

The aluminum having the large specific gravity is discharged from the lower discharge portion 44 by separating the aluminum and the plastic by means of hydrocyclone 43, a water attached to the aluminum is removed by a dryer 48 via a water amount adjusting device 47, and the aluminum is recovered in a recovery port 49. The plastics are conveyed to the plastics separation process from an upper discharge portion 46, and are separated into the PET and the PP after passing through the plastics separation process 5 mentioned above. By passing through these processes, it is possible to select and recover the plastics at each of materials from the plastic bottles in which the aluminum is mixed.

Figure 6:
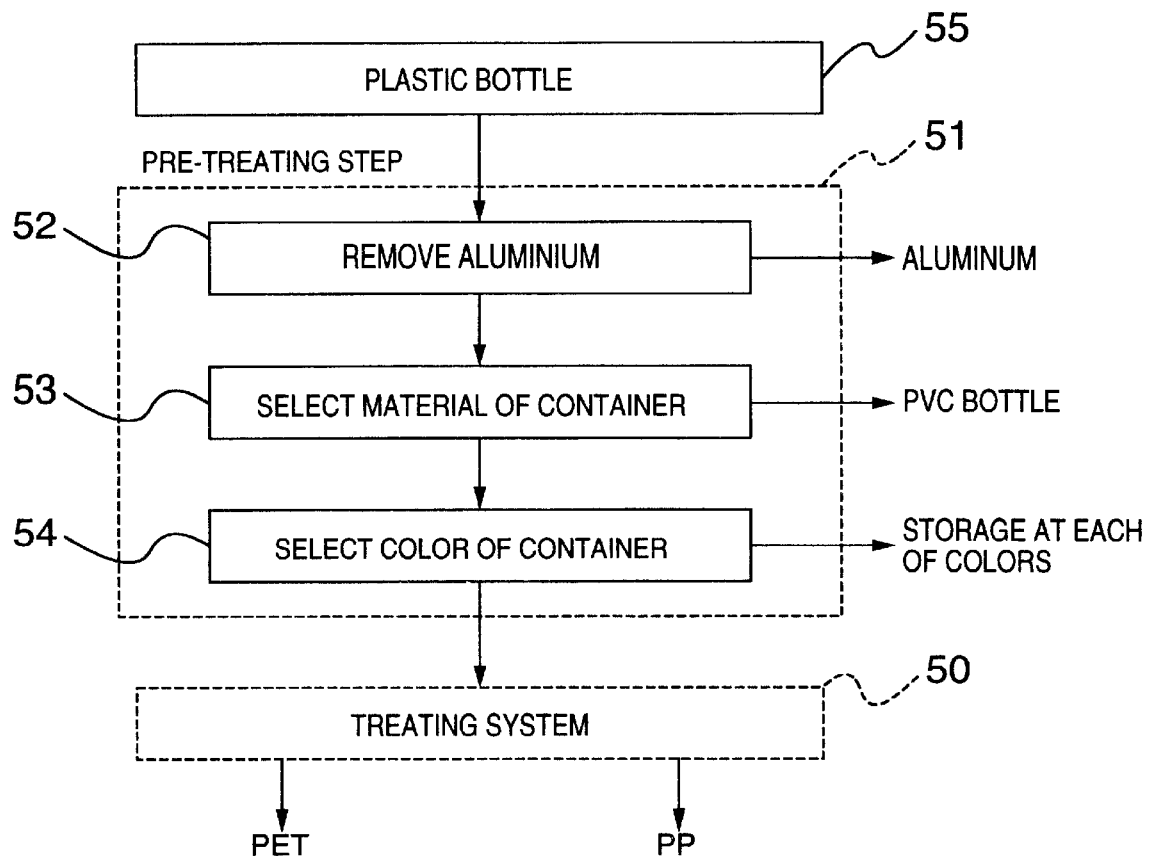
FIG. 6 is a flow chart of a pre-treating process.

Next, a fourth embodiment will be described below with reference to FIG. 6. FIG. 6 shows a flow chart of a pre-treatment in a treating system of selecting and recovering the plastic bottles at each of materials.

Plastic bottles 55 include various kinds of bottles made of PVC and PP in addition to the PET bottle, and additionally, there are sold colorless bottles and colored bottles. A treating system 50 is a system having any one of the treating functions described in the first to fourth embodiments, and is used in combination with a pre-treating process 51 capable of recovering and treating from the plastic bottles at a high purity. The pre-treating process 51 is constituted by an aluminum cap removing process 52, a bottle material selecting process 53 and a bottle color selecting process 54. In the present embodiment, a treating method of selecting taking out transparent PET bottles from the plastic bottles 55 and selecting and recovering the plastic in the treating system 50 will be exemplified.

When putting the plastic bottles 55 into the pre-treating process 51, at first, aluminum caps and aluminum rings mounted to the bottles are manually removed in the aluminum removing process 52, thereby preventing the metals from being mixed to the recovered plastic pieces. This aluminum removing process 52 may be constituted by automatically cutting the neck portion of the pet bottle. Next, the plastic bottles from which the aluminum is removed are supplied to the container material selecting process 53, the material of the containers is selected by a plastic material distinguishing apparatus employing a spectrum method due to near infrared rays, and the containers are recovered at each of the materials, whereby the plastics which have similar specific gravity and are hard to be separated in the plastics separation process 5, such as the PVC (having a specific gravity of 1.25 to 1.36) and the PET (having a specific gravity of 1.27) are previously separated. In this case, it is possible to distinguish the plastics by reading identification marks attached to the plastic bottles by means of an image treatment. Next, the material selected PET containers are supplied to the container color selecting process 54, the colors of the containers are selected by a plastic color distinguishing apparatus employing an RGB comparing method of transmitting rays, and the containers are recovered at each of colors. The transparent PET bottles taken out from the plastic bottles 55 by successively passing through the cap removing process 52, the container material selecting process 53 and the container color selecting process 54 are supplied to the treating system 50, whereby a high quality PET and PP plastic can be recovered.

In this case, when exchanging the treating orders of the aluminum removing process 52 and the material selecting process 53, the aluminum removing process 52 is required for each of the materials. Accordingly, it is suitable that the orders are not exchanged. The material selecting process 53 and the color selecting process 54 may be exchanged.

Figure 7:
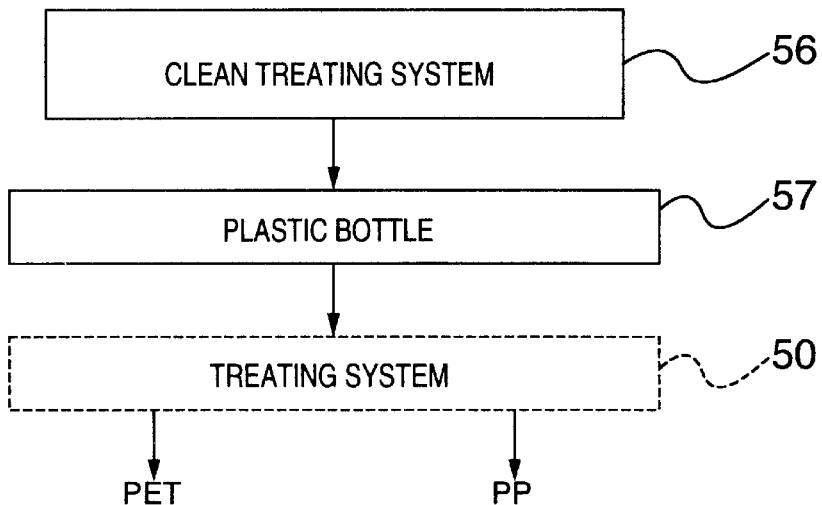
FIG. 7 is a flow chart of an operation in the case of switching and treating plastic bottles to be treated.

Next, a seventh embodiment will be described below with reference to FIG. 7. FIG. 7 shows a flow chart of a system of separately recovering the plastics in the treating system 50 after switching the plastic bottles having different materials and colors treated in the pre-treating processes. In the present embodiment, an operating method of the present system will be described in accordance with an embodiment of treating the transparent PET bottles in a process after treating the colored PET bottles.

At a time of operating the treating system 50 after switching the bottles from the colored PET bottles to the transparent PET bottles, since the colored PET crushed pieces treated in the preceding process are attached and stayed within the apparatuses such as the crushing apparatus, the selecting apparatus and the like, for the purpose of preventing the plastics having different colors from being mixed in the recovered plastics, the treating system 50 is cleaned 56.

In the dry type crushing process 2, the cleaning and grading process 3 and the air separation process 4, the colored plastics are blown out by using an air brush so as to clean the apparatuses, thereby removing the colored plastics. Further, in the wet type metal separation process 38 and the plastics separation process 5, the water within the water tank is replaced and the apparatuses are cleaned, thereby removing the colored plastics. The transparent PET bottles 57 are supplied to the treating system 50 after removing the colored plastics by the cleaning operation, whereby the transparent PET and PP can be selected and recovered.

In accordance with the embodiments mentioned above, there can be obtained effects that it is possible to increase the selecting rate in selecting the plastics and it is possible to reduce an amount of the water to be retreated which is used in the processes.

What is claimed is:

1. A plastic treating system comprising:
    a crushing apparatus for crushing a composite plastic mainly formed by a plastic as a main material into crushed pieces;
    a dry cleaning apparatus having an inlet port for inputting the crushed pieces crushed by the crushing apparatus into the dry cleaning apparatus, a discharge port that is selectably openable to discharge the crushed pieces from the dry cleaning apparatus, and closeable to retain the crushed pieces in the dry cleaning apparatus, a discharge valve to selectably open and close the discharge port of the dry cleaning apparatus, and a mechanism for transferring the crushed pieces from the inlet port to the discharge port and for applying a mechanical impact force and frictional force to the crushed pieces while the discharge valve is closed to clean the crushed pieces; and
    a selecting apparatus for selecting the crushed pieces into various kinds of plastics by utilizing a difference in a specific gravity of the cleaned crushed pieces.

2. A plastic treating system as claimed in claim 1, wherein said selecting apparatus is a fluid type cyclone.

3. A plastic treating system according to claim 1, wherein the dry cleaning apparatus comprises means for discharging dirt scraped from the crushed pieces from the dry cleaning apparatus.

4. A plastic treating system comprising:
    a crushing apparatus for crushing a composite plastic mainly formed by a plastic as a main material into crushed pieces;
    a dry cleaning apparatus having an inlet port for inputting the crushed pieces crushed by the crushing apparatus into the dry cleaning apparatus, a discharge port that is selectably openable to discharge the crushed pieces from the dry cleaning apparatus, and closeable to retain the crushed pieces in the dry cleaning apparatus, a discharge valve to selectably open and close the discharge port of the dry cleaning apparatus, and a mechanism for transferring the crushed pieces from the inlet port to the discharge port and for applying a mechanical impact force and frictional force to the crushed pieces while the discharge valve is closed to clean the crushed pieces;
    a removing apparatus for removing metal pieces from the cleaned crushed pieces; and
    a selecting apparatus for selecting the crushed pieces into various kinds of plastics by utilizing a difference in a specific gravity of the crushed pieces from which the metal pieces are removed.

5. A plastic treating system as claimed in claim 4, wherein said metal pieces removing apparatus is a fluid type cyclone and said selecting apparatus is a fluid type cyclone.

6. A plastic treating system according to claim 4, wherein the dry cleaning apparatus comprises means for discharging dirt scraped from the crushed pieces from the dry cleaning apparatus.

7. A plastic treating system comprising:

a crushing apparatus for crushing a composite plastic mainly formed by a plastic as a main material into crushed pieces;

a dry cleaning apparatus having an inlet port for inputting the crushed pieces crushed by the crushing apparatus into the dry cleaning apparatus, a discharge port that is selectably openable to discharge the crushed pieces from the dry cleaning apparatus, and closeable to retain the crushed pieces in the dry cleaning apparatus, a discharge valve to selectably open and close the discharge port of the dry cleaning apparatus, and a mechanism for transferring the crushed pieces from the inlet port to the discharge port and for applying a mechanical impact force and frictional force to the crushed pieces while the discharge valve is closed to clean the crushed pieces;

an air separation apparatus for removing crushed pieces having a small specific gravity among the cleaned crushed pieces by an air force; and a selecting apparatus for selecting the crushed pieces into various kinds of plastics by utilizing a difference in a specific gravity of the crushed pieces obtained by the air separation.

8. A plastic treating system as claimed in claim 7, wherein said selecting apparatus is a fluid type cyclone.

9. A plastic treating system according to claim 7, wherein the dry cleaning apparatus comprises means for discharging dirt scraped from the crushed pieces from the dry cleaning apparatus.

10. A plastic treating system comprising:

a crushing apparatus for crushing a composite plastic mainly formed by a plastic as a main material into crushed pieces;

a dry cleaning apparatus having an inlet port for inputting the crushed pieces crushed by the crushing apparatus into the dry cleaning apparatus, a discharge port that is selectably openable to discharge the crushed pieces from the dry cleaning apparatus, and closeable to retain the crushed pieces in the dry cleaning apparatus, a discharge valve to selectably open and close the discharge port of the dry cleaning apparatus, and a mechanism for transferring the crushed pieces from the inlet port to the discharge port and for applying a mechanical impact force and frictional force to the crushed pieces while the discharge valve is closed to clean the crushed pieces;

an air separation apparatus for removing crushed pieces having a small specific gravity among the cleaned crushed pieces by an air force;

a removing apparatus for removing metal pieces from the crushed pieces obtained by the air separation; and a selecting apparatus for selecting the crushed pieces into various kinds of plastics by utilizing a difference in a specific gravity of the crushed pieces from which the metal pieces are removed.

11. A plastic treating system according to claim 10, wherein the dry cleaning apparatus comprises means for discharging dirt scraped from the crushed pieces from the dry cleaning apparatus.

* * * * *